Aug. 21, 1956  J. M. WALTER  2,759,240
MACHINE TOOL RAIL STRUCTURE
Filed April 13, 1953  3 Sheets-Sheet 2
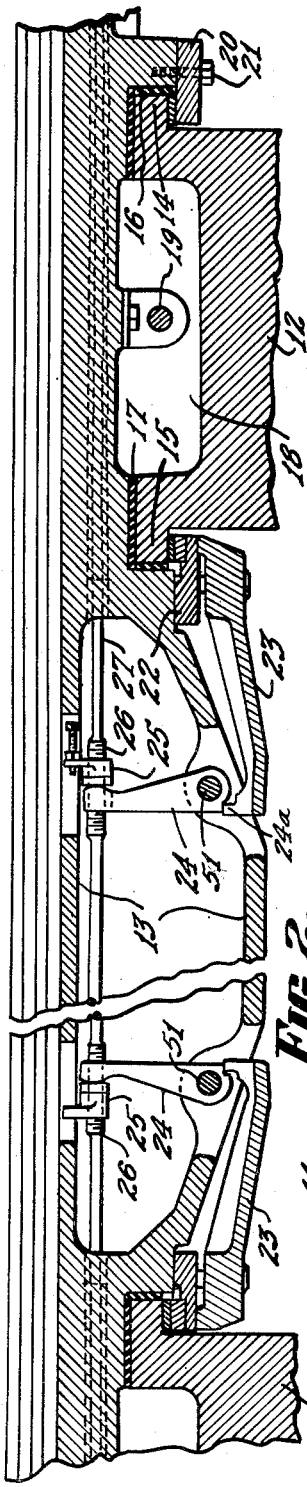
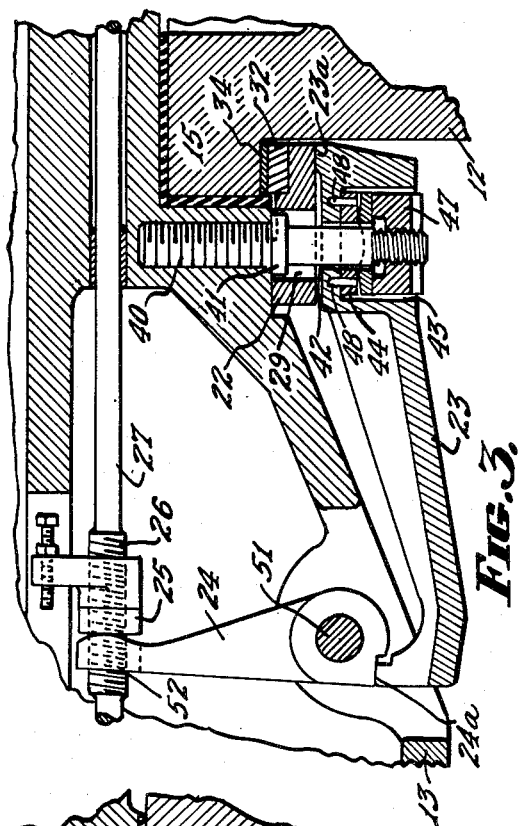
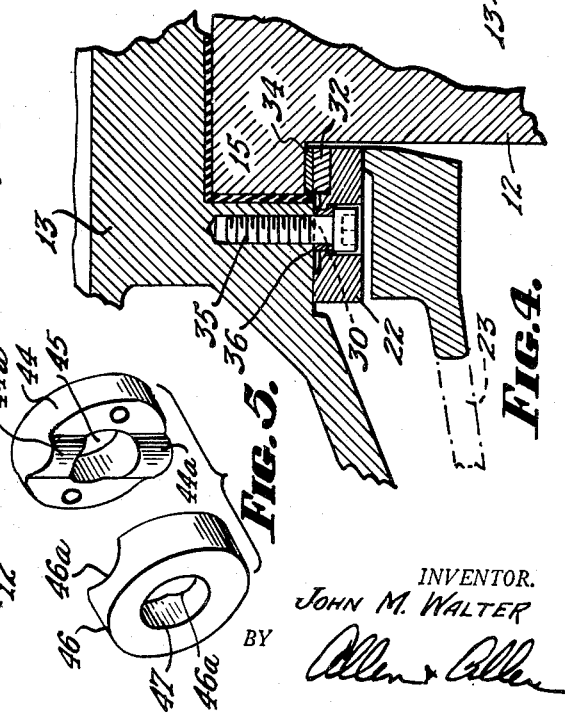
INVENTOR.
JOHN M. WALTER
BY
ATTORNEYS Aug. 21, 1956　　　J. M. WALTER　　　2,759,240
MACHINE TOOL RAIL STRUCTURE
Filed April 13, 1953　　　　　　　　　　3 Sheets-Sheet 3
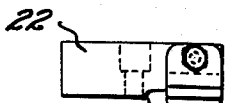
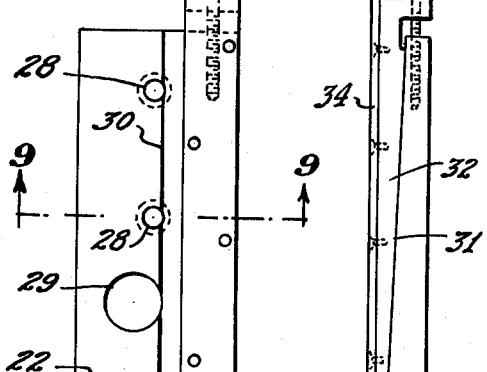
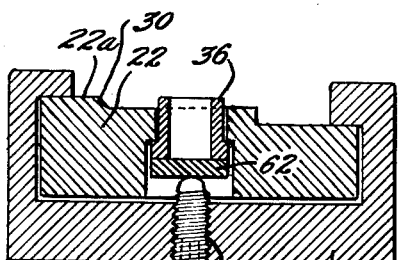
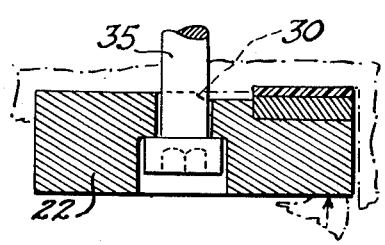
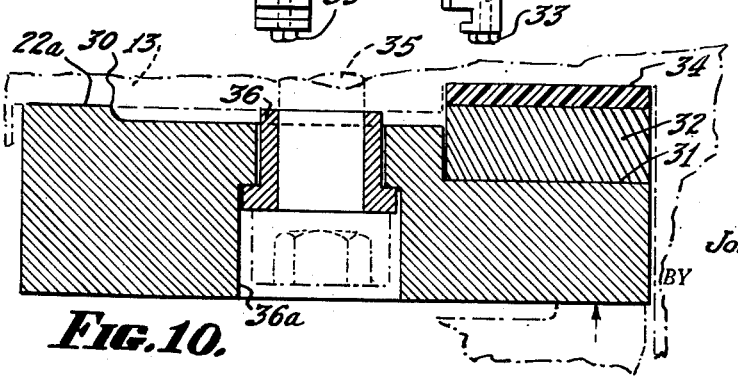
INVENTOR.
JOHN M. WALTER
BY
ATTORNEYS.

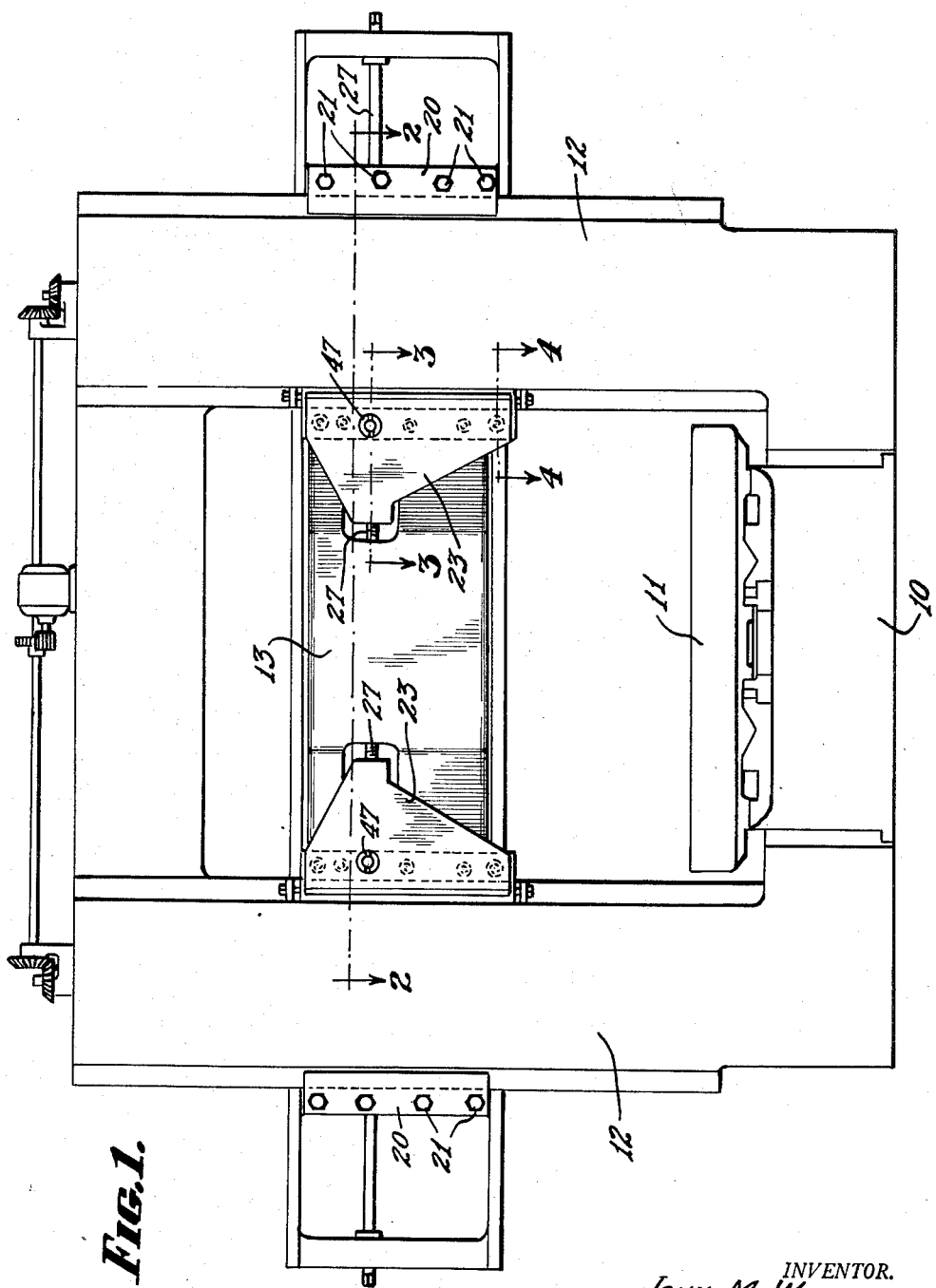

United States Patent Office 2,759,240  
Patented Aug. 21, 1956

2,759,240

MACHINE TOOL RAIL STRUCTURE

John M. Walter, Cincinnati, Ohio, assignor to The G. A. Gray Company, Cincinnati, Ohio, a corporation of Ohio Application April 13, 1953, Serial No. 348,253

12 Claims. (Cl. 29—1)

This invention relates to a machine tool rail structure and particularly for that type of machine tool known as a planer type, double housing milling machine. In a machine of this type there is a bed upon which a table may reciprocate and on each side of the bed there is a vertical housing. Each housing is provided with guide means and a rail having guide recesses is arranged transversely of the housing and is guided upon the housings for movement vertically with respect thereto.

In a planer type, double housing milling machine it is frequently desirable to perform work while feeding the rail vertically, and for this purpose it is necessary to have accurate guiding of the rail with respect to the housings, and it is also desirable to be able to clamp the rail to the housings in a rigid manner.

Clamping arrangements for machines of this type are not new, but in the past there has not been an adequate guide means for the inner flanges of the guide when the clamping mechanism was in unclamped position.

It is therefore an object of the present invention to provide a structure as above outlined, which in the unclamped position will still have a guiding function.

It is yet another object of the invention to provide a gibbed guide means for the inside flange of the housings so that the amount of twist encountered in the rail will be greatly reduced. In the past, gib means for the rail have been provided in connection with the outer flanges of the guide, and since the torsion effect or twist effect varies with the distance, the torsion effect is greatly reduced by providing gibs for the inside or inner flanges of the housings.

In the past, also gib means have been provided for the inner flanges of the housings but with clamping means at the outer edges. To obtain the maximum stiffening of the rail for all working conditions, both the gib means and the clamping means should be at the inner flanges of the housings.

Since the housing faces are now being made of increasingly greater width in order to obtain greater rigidity in connection with the side head mounting, the ratio of the distance between the outer flanges of the housing to the distance between the inner flanges is greatly increased. For example, on a machine with which I am familiar having a nominal width of 48", the distance between the inner flanges of the housings is 61" and the distance between the outer flanges is 115". Since the rigidity of a beam varies as the cube of the distance between the supports (in this case the gibs and clamps) it will be seen that the retention at the inner flanges increases the stiffness approximately 670 percent in this instance.

It is a still further object of the invention to provide a clamping plate which is rigidly clamped to the rail in such manner that it cannot exert a binding or clamping effect merely by virtue of being rigidly secured in position, but which is susceptible of being provided with gib means so that it may have a permanent guiding function.

It is still another object of the invention to provide means for rocking such clamping plate so that it may effect a clamping action.

These and other objects of the invention which will be described in more detail hereinafter, or which will become apparent to those skilled in the art upon reading these specifications, I accomplish by that certain construction and arrangement of parts, of which I shall now describe an exemplary embodiment.

Reference is made to the drawings forming a part hereof, and in which:

Figure 1 is an end elevational view of a planer type, double housing milling machine, as seen from the rear end of the machine;

Figure 2 is a fragmentary cross sectional view of the same on a greatly enlarged scale taken on the line 2—2 of Figure 1;

Figure 3 is a still further enlarged fragmentary cross sectional view taken on line 3—3 of Figure 1;

Figure 4 is a view similar to Figure 3 but taken on the line 4—4 of Figure 1;

Figure 5 is an exploded perspective view of the cooperating fulcrum washers;

Figure 6 is an elevational view of one of the clamping plates with its associated gibs;

Figure 7 is an edge view of the same as seen from the right of Figure 6;

Figure 8 is an end view of the same as seen from the top of Figure 6;

Figure 9 is a cross sectional view on an enlarged scale taken on the line 9—9 of Figure 6;

Figure 10 is a view similar to Figure 9 showing a modified construction; and

Figure 11 is a cross sectional view similar to Figure 9 showing a step in the manufacture of the clamping plate.

Briefly, in the practice of my invention I provide a guide and clamping plate secured to the rail in a position to exert guiding and clamping action on the inner flange of the housing. The clamping plate is so constructed that it is capable of rocking movement only in a clamping direction so that when it is not in clamping position it acts as a fixed guide member. Thus, I am able to provide in connection with the clamping plate gib means for guiding the rail with respect to the housing.

Referring now in more detail to the drawings, I have shown in Figure 1 a general view of a machine of the type toward which this invention is directed, and it will be observed that the machine comprises a bed 10 upon which a table 11 may be reciprocated. On each side of the bed are the housings 12, and a rail generally indicated at 13 extends transversely of the housings and is provided with means for feeding it upward or downward along the housings.

Referring now to Figure 2, the housings or columns 12 are provided with the outer flanges 14 and the inner flanges 15. The rail 13 is provided with the recesses 16 and 17 to cooperate with the guide flanges 14 and 15. The columns are recessed as at 18 for passage of the elevating mechanism for the rail indicated generally at 19. This mechanism will not be described further since it is in all respects conventional.

For guiding the rail at the outer flanges of the columns I provide the guide plates 20 which are simply bolted to the rail as by means of bolts 21. For guiding and clamping the rail at the inner flanges of the columns I provide the guiding and clamping plates 22 which are actuated by the clamping levers 23. The clamping levers 23 are in turn operated by the levers 24 by means of the nuts 25, engaging thread 26 on the shaft 27, as is well known.

Referring now to Figures 6, 7 and 8 for a description of the clamping plate, it will be seen that this plate is an elongated generally rectangular element provided with a row of counterbored holes 28, by means of which the clamping plate is secured to the rail. The plate is also provided with an aperture 29, the purpose of which will be described hereinafter. It will be observed that the clamping plate 22 is relieved from a point indicated at 30 on a line just beyond a line connecting the axes of the holes 28 in the direction of clamping so as to provide a fulcrum line about which the plate may rock. From a consideration of Figure 8 it will be clear that the plate 22 may rock in a clockwise direction about the line 30.

To the right of the line 30 there are provided the sloping surfaces 31 with which the gibs 32 may coact in well known manner. The gibs 32 are secured to the plate 22 by the bolts 33 in well known manner. Preferably, the gibs 32 will be provided with spacing elements 34 of resin laminate. This may be made up of cloth laminae, laminated by means of a phenolic type resin binder. The rail is also preferably faced with such material where it contacts the columns.

The clamping plates are assembled to the rail by means of a number of bolts 35, as best seen in Figure 9. The bolts 35 pass through the plates 22 and are screwed into the rail 13. The relationship between the fulcrum line 30 and the bolt axis is clearly visible in Figure 9.

It will be clear from a consideration of this figure that because of the fact that the fulcrum 30 is to the right of the axes of the bolts 35, the bolts 35 may be drawn up tightly to secure the plate 22 to the rail without at the same time exerting a binding effect against the flange 15. It will also be clear from a consideration of Figure 9 that the plate 22 can rock slightly about the fulcrum line 30 in a counter-clockwise direction as seen in these figures, but that it cannot rock at all in a clockwise direction. Thus, when the plate 22 is in unclamped condition it cannot rock in a clockwise direction, and thus continues to maintain a guiding function through the gibs 32.

In Figure 10 I have shown a modification involving the use of ferrules 36, and in Figure 11 I have shown a jig which is useful in machining the ferrules to have exactly the same height so that when they are seated in the counterbores 36a, their ends are flush with the bearing surface 22a of the plate 22. The jig consists of an element 60 into which the clamping plate 22 fits and a clamp screw 61 and plate 62 hold the ferrule 36 in position so that it may be machined to the same height as the surface of the member 22. When the ferrules 36 are used as shown in Figures 4 and 10, the fulcrum line 30 may be anywhere, including to the left of the centerline of the screws 35. The reason for this is that the ferrules, prepared as outlined above, prevent the occurrence of a binding action when the bolts 35 are tightened up.

Coming now to a description of the actuating mechanism, and referring more particularly to Figure 3, this view is taken through the axis of the aperture 29, referred to in connection with Figure 6, and it will be seen that a bolt 40 is screwed into the rail, the bolt being provided with the collar 41 so that it may be screwed into place tightly. The aperture 29 has clearance around the collar 41 so that the presence of the bolt 40 does not in any way affect the movement of the clamping plate.

The clamping lever itself indicated at 23 is generally triangular in shape as best seen in Figure 1, and it has an aperture 42 and counterbore 43. Seated in the counterbore 43 and pinned to the member 23 is a washer 44 having a hole 45 therethrough and cooperating with another washer 46 having a hole 47 therethrough. The bolt 40 passes through the washers 44 and 46 and a nut 47 holds the parts in assembly.

Referring to Figure 5 it will be observed that the washer 44 has a cylindrical protuberance 44a, and washer 46 has a cylindrical depression 46a. The axis of the cylindrical protuberance and depression is parallel to the axis of the fulcrum 30, and the maintenance of this position is assured by the pins 48. The long side of the triangular lever 23 is provided with a contacting foot 23a which engages the clamping plate 22 adjacent its free edge. The apex of the triangular plate 23 opposite the long edge 23a is substantially on a line perpendicular to the edge 23a and passing through the axis of the bolt 40. As will be clear from a study of Figure 3, clamping action is achieved by a downward movement of the left-hand end of the lever 23. Or in other words, by a counter-clockwise rocking movement about the complementary surfaces 44a, 46a, with the nut 47 bearing the reaction thrust. The clamping movement of the lever 23 is produced by the actuator element 24 which is pivoted in the rail at 51, and which is provided at its other end with a fork element 52 which is engaged by the nut 25, as it moves toward the left of Figure 3. The actuator 24 has an engaging notch 24a which acts against the free end of the lever 23.

It will be clear that numerous modifications may be made without departing from the spirit of the invention, and I therefore wish it to be understood that I do not intend to limit myself except as set forth in the claims which follow.

Having now fully described my invention, what I claim as new and desire to secure by Letters Patent, is:

1. A clamping mechanism for the rail of a planer type, double housing milling machine, the housing being provided with guides having inner and outer flanges, and said rail being provided with guide recesses arranged to cooperate with said guide flanges, retaining plates secured to said rail for engagement over the outside flanges of said guides, clamping elements each having a bearing surface and an adjoining relieved surface defining at their juncture a fulcrum for said elements, said bearing surfaces being bolted to said rail adjacent said fulcrum with said relieved surfaces over the inner flanges of said guides, and means for causing said clamping elements to rock slightly about said fulcrums to clamp said inner flanges, said clamping elements in unclamped condition retaining a guiding function by virtue of the fact that their bearing surfaces are bolted to said rail.

2. A structure according to claim 1, wherein said clamping elements are provided with gib means coacting with the inner flanges of said guides.

3. A structure according to claim 2, wherein said gib means have secured thereto a facing of resin laminate.

4. In a rail clamping mechanism, a rail having a guide recess in which a flanged guide is adapted to engage, a clamping plate bolted to said rail by a row of bolts and extending over said guide recess, said plate having a fulcrum just beyond a line connecting the axes of the bolts in the direction of said guide recesses, whereby said bolts may be tightened so that said plate is held in a guiding position without causing a binding action thereof, said clamping plate being capable of rocking about said fulcrum from said guiding position in a clamping direction and back to said guiding position only, said bolts holding said clamping plate against rocking in the opposite direction from said guiding position, whereby said clamping plate in the bolted but unclamped position maintains a guiding function, and means to produce rocking movement of said clamping plate for clamping purposes.

5. A structure according to claim 4, wherein said clamping plate, in the region extending over said guide recess, is provided with gib means.

6. A structure according to claim 5, wherein said gib means have secured thereto a facing of resin laminate.

7. In a rail clamping mechanism, a rail having a guide recess in which a flanged guide is adapted to engage, a clamping plate bolted to said rail by a row of bolts and extending over said guide recess, said plate being relieved longitudinally from a line just beyond the line connecting the axes of said bolts in the direction of said guide recess, to provide a fulcrum about which said plate may rock in a clamping direction, and whereby said bolts may be tightened without producing a clamping action, said bolts preventing a rocking in the opposite direction, whereby said clamping plate in the unclamped position maintains a guiding function, an aperture in said plate, a fulcrum bolt passing through staid aperture and tightly screwed into said rail, an actuating lever having a counterbored aperture, a pair of washers in said counterbore having mutually engaging complementary cylindrical elements, the axes of said cylindrical elements being parallel to the line constituting the fulcrum of said plate, said fulcrum bolt passing through the aperture in said lever and through said washers, and a nut engaging the end of said fulcrum bolt, said lever having an element to engage said clamping plate adjacent its free edge, and an actuating lever arm, and means for actuating said actuating lever arm.

8. A structure according to claim 7, said lever being generally triangular in form, one side of said triangle being of a length substantially equal to that of said clamping plate and constituting the element to engage said clamping plate, the opposite apex of said triangle constituting the end of said actuating lever arm, and said fulcrum bolt being disposed on a line perpendicular to said one side of said triangle, and passing through said opposite apex.

9. In a rail clamping mechanism, a rail having a guide recess in which a flanged guide is adapted to engage, a clamping plate having a bearing surface bolted to said rail by a row of bolts and extending over said guide recess, the bolt holes in said plate being counterbored and having flanged ferrules seated therein having their ends flush with the bearing surface of said plate, and said bolts passing through said ferrules, and bearing against the flanges thereof, said plate being relieved over a portion at least of its width, whereby said bolts may be tightened without causing a binding action of said clamping plate, said clamping plate being capable of rocking about said row of bolts in a clamping direction but prevented by said bolts from rocking from rocking in the opposite direction, whereby said clamping plate in unclamped position maintains a guiding function, and means to produce rocking movement of said clamping plate for clamping purposes.

10. A structure according to claim 9, wherein said clamping plate, in the region extending over said guide recess, is provided with gib means.

11. A structure according to claim 10, wherein said gib means have secured thereto a facing of resin laminate.

12. In a rail structure for a double housing machine tool having flanged housings, adjustable gibs bearing against the rear faces of the flanges on the inner sides of the housings to provide a running fit between said gibs and the front faces of said housings when the rail is fed vertically on said housings, clamping levers pivotally mounted on said rail and arranged to clamp said rail to said housings through said gibs, and an operative linkage for actuating said clamping elements concurrently.

References Cited in the file of this patent
UNITED STATES PATENTS

| | | |
|---|---|---|
| 1,813,335 | Lucas | July 7, 1931 |
| 2,049,842 | Kling | Aug. 4, 1936 |
| 2,638,659 | Walter | May 19, 1953 |